US007030874B2

(12) United States Patent
 Allouche

(10) Patent No.: US 7,030,874 B2
(45) Date of Patent: Apr. 18, 2006

(54) METHOD OF FOLLOWING THE THREE-DIMENSIONAL DEFORMATION OF A DEFORMABLE ORGAN

(75) Inventor: Cyril Allouche, Montfort l'Amaury (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 211 days.

(21) Appl. No.: 10/218,205

(22) Filed: Aug. 13, 2002

(65) Prior Publication Data

US 2003/0048267 A1 Mar. 13, 2003

(30) Foreign Application Priority Data

Aug. 14, 2001 (FR) .................................. 01 10808

(51) Int. Cl.
 *G06T 15/00* (2006.01)
(52) U.S. Cl. ...................... 345/419; 345/420; 128/916; 378/4
(58) Field of Classification Search ................ 345/419, 345/420; 600/443; 128/916; 378/4
 See application file for complete search history.

(56) References Cited

U.S. PATENT DOCUMENTS

| 5,217,016 A | 6/1993 | Axel |
| 2002/0122577 A1 | 9/2002 | Allouche ..................... 382/131 |
| 2002/0176637 A1 | 11/2002 | Allouche ..................... 382/288 |

FOREIGN PATENT DOCUMENTS

| EP | 1 225 545 A1 | 7/2002 |
| EP | 1 296 286 A1 | 3/2003 |
| WO | WO 92/03089 | * 3/1992 |

OTHER PUBLICATIONS

"A Method for registration of 3D shapes", IEEE Trans. On Pattern Analysis and Machine Intelligence, 14(2): 239-256, Feb. 1993, P. Besl and N. McKay.

Park, Jinah, et al., "Deformable Models with Parameter Functions for Left Ventricle 3-D Wall Motion Analysis and Visualization" Computers in Cardiology, IEEE, 1995, pp. 241-244.

Park, Jinah, et al.; "Analysis of Left Ventricular Wall Motion Based on Volumetric Deformable Models andMRI-SPAMM" Medical Image Analysis, vol. 1, No. 1, Oxford University Press, pp. 53-71.

* cited by examiner

*Primary Examiner*—Kimbinh T. Nguyen
(74) *Attorney, Agent, or Firm*—Fay Sharpe Fagan, Minnich & McKee

(57) ABSTRACT

A method of obtaining a three-dimensional deformation of an organ which is deformable over time and extends in a three-dimensional space from at least two sets of data (DS(t1), DS(t2)) representing points of said organ and corresponding to distinct times (t1, t2) in the deformation of the organ. A correspondence (SEL(t1,t2)) between the points in the sets of data being determined (COR), said method uses a definition (DEF) of notional planes (Pi) on which there are defined explicit equations (EQi) of the deformation of the organ including unknown parameters (PARi(t1, t2)). The parameters (PARi(t1, t2)) are calculated (CAL) for each equation (EQi) and the explicit equations (Esp.) obtained are then utilized (EXT) in order to define the deformation in the three-dimensional space (DEF3D(t1,t2)) by weighting functions defined for the points in the space.

12 Claims, 2 Drawing Sheets

METHOD OF FOLLOWING THE THREE-DIMENSIONAL DEFORMATION OF A DEFORMABLE ORGAN

BACKGROUND

The invention relates to a method of obtaining a three-dimensional deformation of an organ which is deformable over time and extends in a three-dimensional space using at least two sets of data representing points on said organ and corresponding to distinct times in the deformation of the organ. This invention also relates to an apparatus for implementing the method described above.

The invention finds its application in the field of the processing of medical images. Many acquisition methods can in fact benefit from the application of the method according to the invention provided that, between two acquisitions of the organ, points on a first acquisition can be matched with points on a second acquisition. Thus, using known readjustment algorithms, the method can be used for images obtained by ultrasonic, radiological or magnetic resonance techniques. In particular the organ images marked by spatial magnetic resonance modulation make it possible to obtain the deformation of an organ on an acquisition plane very faithfully. This is because this marking is visible on the images in the form of marking lines with points of intersection. The marking lines deform while following the deformation of the organ. Said points of intersection are then chosen as points for which a correspondence is known.

A method of obtaining the three-dimensional deformation of an organ is already known in the state of the art through the publication by Park et al. entitled "Analysis of left ventricular motion based on volumetric deformable models and MRI-SPAMM", Medical Image Analysis 1(1): 53–71 (1996). In this document, Park proposes a method of reconstructing the three-dimensional movement of the left ventricle of the heart using data marked by spatial magnetic resonance modulation. The technique presented uses parameterized volumes whose parameters are to be determined as a function of the marked data. To use parameterized volumes, it is necessary to make a first convergence of a mesh model governed by mechanical laws, the image data producing forces, to determine the boundaries of the organ and then make an optimized approximation of the deformation of the mesh with respect to the positions of the tags. The calculations generated by this method are complex and, consequently, the method is difficult to automate in real time. Moreover, the deformation parameters are calculated once the second deformation convergence of the mesh has been carried out and this causes propagations of errors at each calculation step.

One object of the invention is to provide a method of quantifying the deformation of the organ with very good precision and with simplified calculations which make it possible to carry out a study in real time. The latter property is essential for the clinical usage of a determination of a three-dimensional movement.

SUMMARY

This is because a method in accordance with the introductory paragraph is characterized according to the invention in that it comprises steps of:
- determining, in one of the sets of data, a set of points of the organ for which a correspondence with a point of another set of data is known, said set of points being termed the selection,
- defining at least two planes perpendicular to each other in the three-dimensional space, and explicit equations on said planes comprising unknown parameters of the deformation of the organ on said planes,
- calculating said unknown parameters for each of the explicit equations on each of the planes using the known correspondences for the points in the selection,
- extrapolating explicit equations of the known deformation on said planes to the set of points of said organ using a spatial weighting of the explicit equations on the planes perpendicular to each other.

When the method is applied to acquisitions in spatial magnetic resonance modulation, the step of determining said parameters of an explicit mathematical expression on each of the planes is advantageously performed according to a technique disclosed in French patent application N° 0100881 of 23.1.01 (US 2002/0176637 published Nov. 28, 2002) for determining the two-dimensional deformation. The planes defined in the defining step of the planes are then chosen to correspond to the acquisition planes. When other acquisition techniques are used, explicit equations as presented in patent application N° 0100881 (US 2002/0176637) are advantageously used for defining the expression of the deformation on notational reference planes defined in the defining step. These planes may be defined automatically or by the user. The same applies to the explicit equations. Whatever the method chosen, the parameters of the explicit equation are ach time defined from the selection, that is to say, the correspondences of points and their positions. The advantage of working on planes makes it possible to very significantly reduce the quantity of calculations, the algorithmic complexity being $N^2$ times the number of planes, rather than $N^3$. Another advantage is to be able to program constraints on the movement more effectively. The explicit equations according to the invention are continuous equations on the plane and the approximating calculation of the deformation is thus subject to a continuity constraint. This continuity constraint is maintained due to the 3D movement. This approximation makes it possible to estimate the movement in the very strict sense of least squares with an explicit mathematical regularization. This regularization corrects the noise. This correction is particularly useful in the case where the correspondence and therefore the movement of the points in the selection is approximate. This is a major advantage compared with the technique disclosed in the state of the art cited, which uses a volume approximation subject to errors at individual points in the matching of the points. The use of constraints makes it possible to take account of a priori knowledge, and of any interaction with the user. The latter may in fact wish to constrain the movement to be complied with at certain points, which he may enter manually in the definition of the planes and equations, with a variable degree of precision.

The invention applies particularly to the heart, which exhibits among other things a deformation in rotation and in contraction. The mathematical expression will then advantageously be chosen as being able to express deformations close to those expected for the organ being imaged.

The invention also relates to an apparatus for implementing the method according to the invention which will comprise means of extracting the parameters of the mathematical expression of the three-dimensional deformation, and means of displaying, in particular three-dimensional, the change in these parameters during the sequence.

BRIEF DESCRIPTION OF THE DRAWINGS

The invention will be further described with reference to examples of embodiments shown in the drawings to which, however, the invention is not restricted.

DETAILED DESCRIPTION OF THE PREFERRED EMBODIMENTS

The method according to the invention is applicable to the sets of data belonging to a sequence of at least two sets of data DS(t1) and DS(t2) taken at two times t1 and t2. These two sets of data represent an organ or part of an organ caused to deform over time and are generally presented in the form of images. The sets of data available will in fact be of different kinds according to the method of acquisition of the organ. These acquisition methods define several embodiments.

Figure 1:
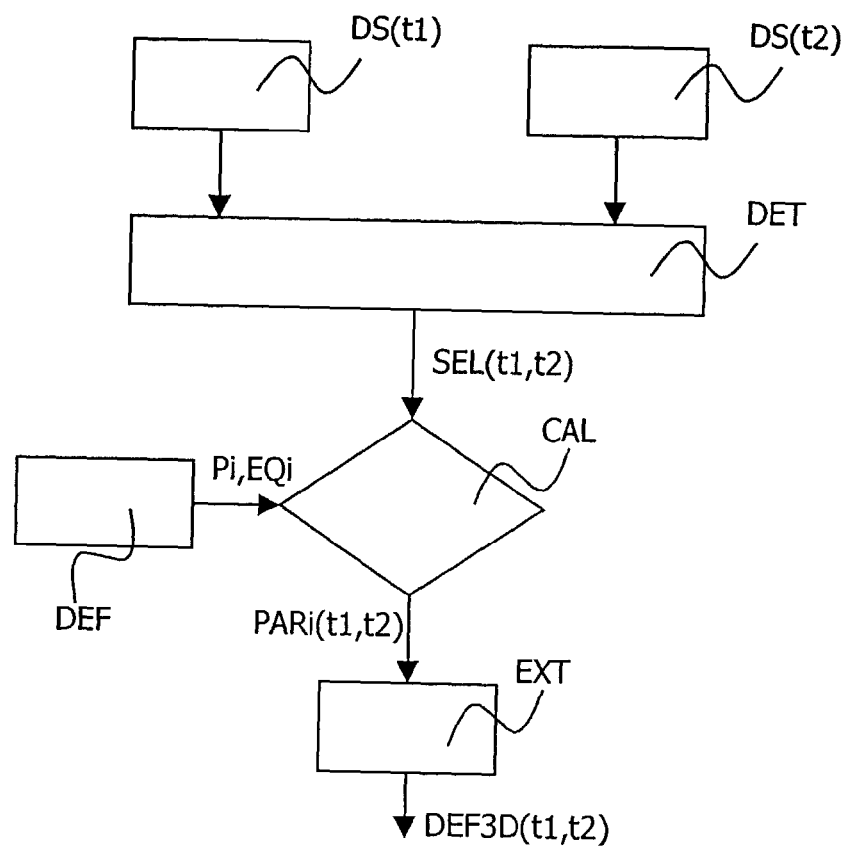
FIG. 1 represents a schematic diagram of a preferred implementation of the method according to the invention.
Figure 2:
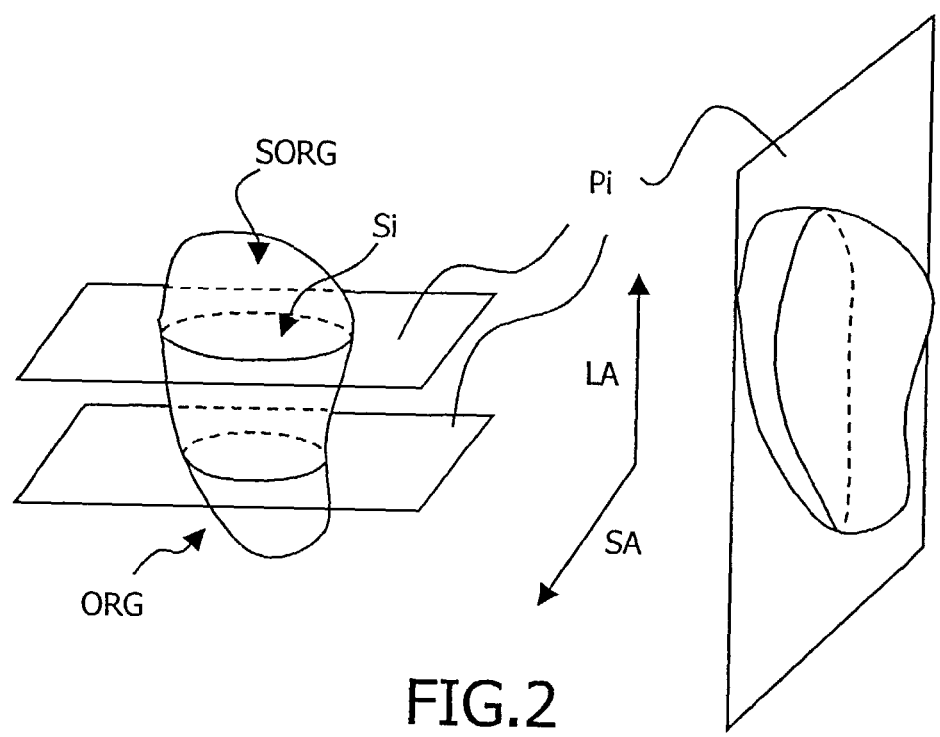
FIG. 2 represents schematically the reference planes for the implementation of the invention.

FIG. 1 depicts a schematic diagram of an implementation of a method according to the invention. In a first preferred embodiment, the sets of data are related to a plane of the organ observed over a sequence of a certain duration. This is the case of an organ imaged according to a spatial magnetic resonance modulation. The method according to the invention processes the sets of data where there are available points for which it is possible to establish correspondences from one set of data to another. In the case of spatial magnetic resonance modulation, the marking lines are such that there exist points of intersection between several marking lines. It is easy to establish correspondences (or one-to-one mapping) from the one image to another for these points of intersection. The correspondences between the points are established in a step COR of determining a set of points for which a correspondence with a point in another set of data is known. This correspondence determination step CO can use for example a method as described in European patent application N°.00403028.4 of Oct. 31, 2000 (US 2002/0122577 published Sept. 5, 2002) included by reference. The set of points obtained is then termed the selection SEL(t1, t2). In another embodiment, the method makes it possible to have knowledge of the position of certain points in a three-dimensional space, this is the case for example with ultrasound and X-rays (tomography), which make it possible to know the position of an interface between two different tissues in space. The points will then be located on the real surface SORG (FIG. 2) of the organ imaged (for example by triangulation of the surface etc). These methods therefore make it possible to place a certain number of points but without it being easy to know the correspondences between the points belonging to two different sets of data corresponding to two different times. The know techniques for effecting readjustments of surfaces do not allow sufficient precision to know the movement from a technique of calculating the deformation such as the one proposed by Park. This is because, the Park technique consisting of making a volume approximation of the organ, any erroneous point on the surface SORG becomes a source of error in calculating the deformation. The invention, for its part, makes it possible to determine the deformation of the organ precisely by using a readjustment process in combination with the method of determining the three-dimensional deformation according to the invention. Usually, for determining the deformation of the tissue it is essential to pass through a readjustment step in order to find an organic point (i.e. one corresponding to a real point on the organ observed) from one set of data to another. Conventionally the readjustment algorithm used is a matching algorithm, for example ICP (Iterative Closest Point, as defined for example in "A method for registration of 3D shapes", IEEE Trans. On Pattern Analysis and Machine Intelligence, 14(2):239–256, February 1993, P. Besl and N. McKay), which makes it possible to have the most probable corresponding point. In parallel to this matched determination step COR, a set DEF of defining planes Pi and equations EQi on each plane Pi is carried out. Referring to FIG. 2, the planes Pi are chosen within the space in which the organ ORG is imaged. Whatever the acquisition technique used, the reference planes are at least two in number, perpendicular to each other. In the preferred embodiment, at least some reference cutting planes Pi advantageously correspond to the acquisition planes since the points in the selection are located on surfaces Si belonging to the acquisition planes. In the case of the heart, which will be the organ imaged in the remainder of the description, a major axis LA and a minor axis SA are commonly defined (FIG. 2). Thus the major axis and minor axis directions of the left ventricle for the acquisition for which the invention can be used are taken in the radiological direction, and strictly perpendicular. Conventionally, during a spatial magnetic resonance modulation study, at least two minor axis planes, at the base and apex levels, and at least one major axis plane are available. For the other acquisition methods, at least two minor axis planes and at least one major axis plane will thus advantageously be defined in the definition step DEF. In the definition step DEF, explicit equations are defined in parallel on the planes defined previously.

In the case of the heart, on the one hand, an explicit equation having the form of an affine transformation of the plane is allocated to each major axis plane: $T(x,y)=M.X+B$, $X=(x,y)$, M matrix 2×2, B translation vector This explicit equation does indeed take account of the movements of the heart in its major axis. These movements are in fact of relatively low complexity. The unknown parameters are those constituting the matrix M and the translation vector B, which are real parameters.

On the other hand, a radial transformation as defined in French patent application N° 0100881 of 23.101 (US 2002/0176637 published Nov. 28, 2002) is allocated to each minor plane. In the case of the heart such an equation and contraction movement of this organ. Central point C being chosen, in the complex plane:

$$f(z)=|z-z_c|(\Sigma_{k=-N' \ldots N\backslash 0} a_k e^{ik\Theta})+d$$

The unknown parameters are identical to those set out in French patent application N° 0100881, that is to say ak, k=−N' . . . N and d (the ak and d values being complex numbers). Globally the unknown parameters are denoted PARi(t1,t2) for each plane Pi. A linearly parameterized movement model is then obtained on all the planes. The calculation of the unknown parameters PARi(t1,t2) of this model therefore relates to the results available either on acquisition planes or through readjustment methods. The linearity allows extremely effective numerical algorithms, as well as the easy use of constraints on the parameters. Thus the results obtained with the readjustment algorithms are greatly improved by constraint according to the invention by explicit equations EQi on chosen reference cutting planes Pi.

Next, in a step CAL, receiving on the one hand the data relating to the selection SEL(t1,t2) and on the other hand the data relating to the planes Pi and to the explicit equations EQi defined on these planes coming from steps COR and DEF, the unknown parameters PARi(t1,t2) of the explicit equations EQi are determined for each of the explicit equations EQi.

In the preferred embodiment, concerning the sets of data for which the acquisition is effected on acquisition planes, the parameters PARi(t1,t2) on the acquisition planes are directly determined according to a least squares approximation as described in French patent application N° 0100881 using for example a determination of the positions of the points according to European patent application N° 00403028.4. As in this patent application, the parameters PARi(t1,t2) on each acquisition plane are overdetermined since the number of points on the planes is high.

In the other embodiment, concerning the determination of the parameters PARi(t1,t2) for the other acquisition methods, the notional planes Pi being defined in space and explicit equations EQi being defined on these planes Pi, the points in the selection SEL(t1,t2), disseminated in space, make it possible to calculate the parameters of the explicit equations on said planes. As seen previously, the observed movement of each point in the selection is defined by means of a readjustment algorithm and is used in an expression of the movement of the point defined as a weighted sum of the deformations on the notional reference planes. This weighted sum is defined for example according to the expressions proposed in the remainder of the description. The generally high number of available points on the observed surface (triangulation etc) makes it possible to obtain over-determined parameters PARi(t1,t2). The method according to the invention therefore makes it possible to smooth the deformation by an artificial passage over notional planes. Here too, the calculation of the parameters is advantageously effected by least squares approximation. In the case of an acquisition method for which the points in the selection are disseminated in space, the use of the weighting functions on the selection SEL(t1,t2) combined with the explicit equations EQi on the reference planes Pi makes it possible to determine the unknown parameters of the explicit equations. The parameterized expressions are then obtained solely on the notional planes.

One of the key principles of the invention is a change from n * 2D to 3D in an extrapolation step EXT. This change will now be described in detail. The geometric space is decomposed into an infinity of major axis and minor axis sections, and the interpolation of the ∞ * 2D deformations is effected from those of the reference planes by the use of a weighted mean. The infinite continuity of the weighting functions ensures great continuity in the 3D space. In order to reconstruct a 3D movement from the 2D movements attached to each of the reference planes (which being notional when the acquisition does not take place on planes), it is necessary to interpolate these various movements throughout the space, so that the resulting movement is continuous and differentiable. Weighting functions detailed below are then introduced. The obtaining of the 3D movement then takes place in this way: each point of dimension z undergoes the minor axis movement calculated as the sum weighted by the value of these weighting functions in terms of z of all the reference minor axis movements. Likewise, if its cylindrical axis is $\phi$, its major axis movement is calculated by the weighted sum of the major axis movements.

Let the cylindrical angles of the major axis planes be $\phi_1 \ldots \phi_n$. Then, with each plane i, the weighting function is for example associated:

$$P_i(\phi)=\Pi_{j\neq i}((\phi-\phi_j)/(\phi_i-\phi_j))[2\pi]$$

When there is only one major axis reference plane, it is taken as being the plane i=1 and no weighting is necessary for this plane. The weighting function is then equal to one and the transformation is always the same whatever the plane of cylindrical angle $\phi$ on which the interpolation is performed.

Let the sides of the minor axis cutting planes be $z_1 < \ldots < z_k$. With each plane $i\neq 1,k$, there is associated the weighting function:

$$Q_i(z)=\Pi_{j\neq i}((z-z_j)/(z_i-z_j))$$

For i=1, the same definition is repeated for $z>z_1$, and $Q_1(z)=1$ for $z<=z_1$. For i=k, same definition for $z<z_k$, =1 for $z>=z_k$.

Take any point M of cylindrical coordinates $r,\phi,z$. It therefore follows the movement:

$$U(M)=(\Sigma P_i(\phi)T_i(M)).e_z e_z+(\Sigma Q_i(z)f_i(M)) \quad (1)$$

where $e_z$ is the unitary vector of the dimensions.

The definitions of the weighting functions means that this movement is continuously and infinitely differentiable. The development of U(M) with respect to the parameters $M_i, B_i, a_k^j, d_j$ (i: major axis planes, j: minor axis) makes it possible to obtain an expression of the 3D movement which is linear in terms of these coefficients.

On evaluation, during a last extrapolation step EXT, the explicit expressions EQi whose parameters PARi(t1,t2) have been determined are extended to the space using the explicit equations of the deformations obtained on the reference planes and using the weighting functions and the expression of the movement U(M) at each point. Given that the deformation is known according to at least two perpendicular planes, the deformation is accessible in all the space by extrapolation. In the case of a calculation of the deformation from data disseminated in space, the errors on the readjustments of points are thus smoothed by the artificial passage to a calculation on planes.

Figure 3:
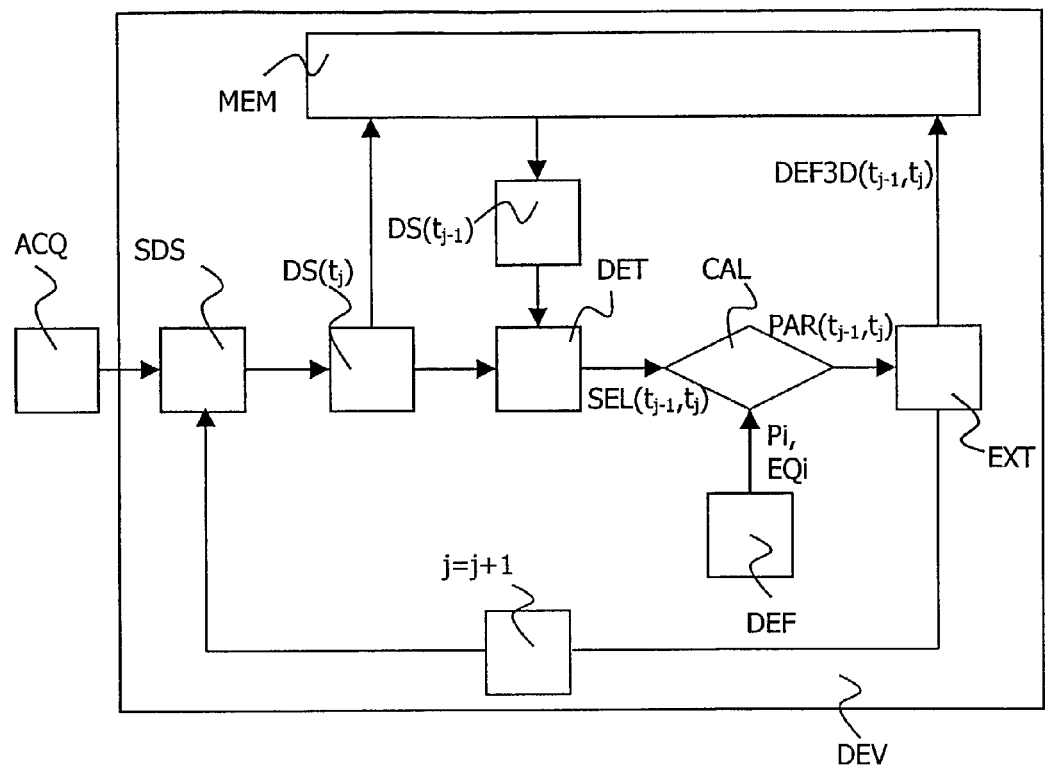
FIG. 3 represents a data processing apparatus according to a particular embodiment of the invention.

FIG. 3 depicts equipment according to a particular implementation of the invention. This equipment is connected to means ACQ of acquiring sequences SDS of X sets of data DS. In the particular implementation depicted in FIG. 3, the method described in FIG. 1 for two sets of data DS(t1) and DS(t2), successive or not, is iterated on all the successive data sets $DS(t_j)$ in the sequence SDS. After an initialization for a counter initialized to j=0, the process described below is initiated. A data set $DS(t_j)$ is extracted from the sequence SDS. Means of determining correspondences COR receive as inputs two data sets DS(tj) and DS(tj−1). For the requirements of the invention, the data sets DS are stored in a memory MEM. The correspondence determination step COR makes it possible to know a selection SEL(tj−1,tj).

At the same time as the determination of the selection, definition means DEF define reference planes Pi in the space of the organ and explicit equations EQi on these planes Pi. Calculation means CAL receive as an input on the one hand the selection SEL(tj−1,tj) and on the other hand the equations EQi defined on the chosen planes Pi. This step CAL makes it possible to obtain as an output the parameters PARi(tj−1,tj) of the explicit equations EQi unknown up till then. A step of extrapolation to the three-dimensional space is then effected by extrapolation means EXT, which give the deformation in the space of each point of the organ DEF3D (tj−1,tj). This deformation is advantageously stored in the memory. The counter is incremented to j=j+1. The iteration of the determination of the deformation on a sequence SDS makes it possible to evaluate the parameters of the deformation and their change over time.

Knowledge of these three-dimensional parameters is important for detecting abnormalities in the behavior of the organ by a practitioner. The invention makes it possible in particular to be able to work without initializing a mesh, any triangulation being able to serve for the invention without having to effect processing on it. Thus it is possible to work with meshes obtained on acquisitions giving good contours but originally not making it possible to calculate the deformation. This makes it possible to supplement an approximation using spatial magnetic resonance modulation images which give good knowledge of the deformations but with poor recognition of the contours. The model and the equations according to the invention being explicit, a direct and therefore very rapid calculation can be carried out in combination with the iterative matched determination algorithms. This represents one of the major advantages of the invention. The parameters of the movement are in fact directly approximated without the approximation of an intermediate quantity (for example the deformation of a mesh), which would introduce errors.

Figure 4:
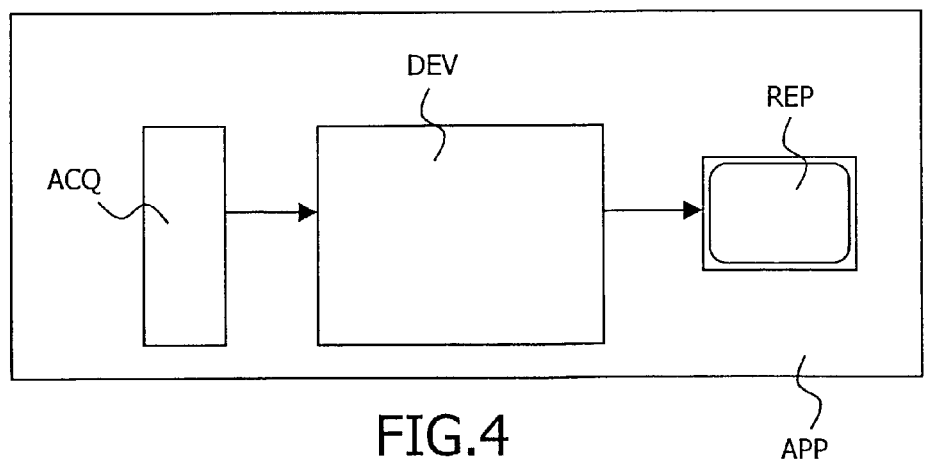
FIG. 4 represents an apparatus for capturing and processing data according to the invention.

FIG. 4 depicts an image acquisition apparatus APP, said apparatus comprising means ACQ of acquiring sequences of at least two sets of data of an organ or part of an organ caused to deform over time, display means REP of visual representation of these images, which can comprise a video mode for following the deformation during the sequence, image processing apparatus DEV as described previously.

There are many ways of implementing the functions presented in the steps of the methods according to the invention by software and/or hardware means accessible to persons skilled in the art. This is why the figures are schematic. Thus, although the figures show various functions performed by different units, this does not exclude a single software and/or hardware means making it possible to perform several functions. Nor does this exclude a combination of software and/or hardware means making it possible to perform a function.

Although this invention has been described in accordance with the embodiments presented, a person skilled in the art will immediately recognize that there exist variants to the embodiments presented and that these variants remain within the spirit and scope of the present invention.

What is claimed is:

1. A method of obtaining a three-dimensional deformation of an organ which is deformable over time and extends in a three-dimensional space from at least two sets of data representing points of said organ and corresponding to distinct times in the deformation of the organ, said method comprising the steps of:
   determining, in one of the sets of data, a set of points of the organ for which a correspondence with a point of another set of data is known, said set of points being termed the selection,
   defining at least two planes perpendicular to each other in the three-dimensional space, and defining explicit equations on said planes comprising unknown parameters of the deformation of the organ on said planes,
   calculating said unknown parameters for each of the explicit equations on each of the planes using the known correspondences for the points in the selection,
   extrapolating the explicit equations from each of said planes to the set of points of said organ in three dimensions using a spatial weighting of the explicit equations defined on the planes perpendicular to each other,
   generating a human viewable display depicting the deformed organ.

2. A method as claimed in claim 1, wherein the selection is a set of points whose correspondences are known by an iterative algorithm which determines the correspondences between the points in a set of data and another set of data.

3. A method as claimed in claim 1, wherein the selection is a set of points belonging to acquisition planes defined by an organ acquisition technique, said acquisition planes being the planes on which the explicit equations are defined in two dimensions.

4. A method as claimed in claim 1, when said organ is marked by spatial magnetic resonance modulation, said marking deforming by following the deformation of the organ and being such that there exist points of the marking which can be located from one set of data to another, the selection then including said locatable points.

5. Equipment comprising:
   a means for receiving or generating data, intended to use at least two sets of data representing points on an organ which is deformable over time and extends in a three-dimensional space with a view to obtaining a three-dimensional deformation of said organ, said sets of data corresponding to distinct moments during the deformation of the organ, said equipment further comprising means of:
   determining a set of points of the organ whose positions are defined within each of the sets of data, said set of points being referred to as the selection,
   defining planes in the three-dimensional space, some of these planes being parallel to each other, the other planes being perpendicular to them, and explicit equations with unknown parameters of the deformation on said planes,
   calculating said unknown parameters for each of the planes using the selection,
   extrapolating explicit equations of the known deformation on said planes to all the points of said organ; and
   a display means for displaying the organ in one or more states of deformation.

6. The equipment as claimed in claim 5, further including:
   a means of determining, using an iterative algorithm, correspondences between the points from one set of data to another, the points for which the correspondences are determined defining the selection.

7. The equipment as claimed in claim 5, wherein the points belong to acquisition planes defined by a data acquisition technique used to receive or generate the points, said acquisition planes being the planes on which the explicit equations are defined.

8. The equipment as claimed in claim 5, wherein said organ is marked by spatial magnetic resonance modulation, said marking deforming while following the deformation of the organ and being such that there exist points of the marking which can be located from one set of data to another, the selection then including said locatable points.

9. The equipment as claimed in claim 5, further comprising:
  a means for iterating, on several sets of data, said sets of data corresponding to distinct moments in the deformation of the organ.

10. A computer program product comprising program code portions/means/instructions for obtaining a three-dimensional deformation of a 3D organ which is deformable over time, by performing the step of:
  in a set of data that represents the organ at one time, determining a set of points which correspond to points in another set of data that represents the organ at another time;
  defining at least two perpendicular planes that intersect the sets of points;
  within each of the defined planes, calculating parameters of explicit equations that define the spatial relationships of the sets of points lying on each of the defined planes;
  spatially weighting the explicit equations to extrapolate from the planes to three dimensions, without deforming a mesh; and
  generating a display signal which controls a monitor to display the organ in one or more deformation states.

11. A method of determining deformation states of an organ, the method comprising:
  generating a plurality of volumetric image representations representing an organ in each of a plurality of deformation states;
  determining a corresponding set of points in each of the volumetric image representations;
  defining a plurality of planes through each of the volumetric image representations;
  on each of the plurality of defined planes, calculating two-dimensional equations that represent spatial relationships of the corresponding set of points in two or more selected deformation states;
  extrapolating the two-dimensional equations to extrapolate the spatial relationships from two dimensions to a three-dimensional spatial relationship between the selected deformation states;
  generating a human viewable display depicting at least a portion of the spatial relationship between the selected deformation states.

12. A computer apparatus which performs the method of claim 11.

* * * * *